(12) United States Patent
Lamb et al.

(10) Patent No.: US 10,389,292 B1
(45) Date of Patent: Aug. 20, 2019

(54) DC BUS REGULATION USING RECTIFIER AND INVERTER

(71) Applicant: Rockwell Automation Technologies, Inc., Mayfield Heights, OH (US)

(72) Inventors: Jacob M. Lamb, Menomonee Falls, WI (US); Ahmed S. Mohamed Sayed Ahmed, Mequon, WI (US); Brian J. Seibel, Grafton, WI (US); Timothy M. Rowan, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/939,741

(22) Filed: Mar. 29, 2018

(51) Int. Cl.
*H02P 1/00* (2006.01)
*H02P 27/08* (2006.01)
*H02P 23/20* (2016.01)
*H02M 3/24* (2006.01)

(52) U.S. Cl.
CPC .............. *H02P 27/08* (2013.01); *H02M 3/24* (2013.01); *H02P 23/20* (2016.02)

(58) Field of Classification Search
CPC ........... H02P 27/08; H02P 27/06; H02P 3/14; H02M 5/4585
See application file for complete search history.

(56) References Cited

U.S. PATENT DOCUMENTS

| 6,768,284 | B2 | 7/2004 | Lee et al. |
| 7,135,835 | B2 | 11/2006 | Yamada et al. |
| 8,384,335 | B2 | 2/2013 | Kuroki et al. |
| 8,994,320 | B2 | 3/2015 | Mo et al. |
| 2013/0002186 | A1* | 1/2013 | Iwahori ................. B60L 11/123 318/722 |
| 2016/0072403 | A1* | 3/2016 | Niwa .................. H02M 1/4225 363/89 |

* cited by examiner

*Primary Examiner* — Karen Masih
(74) *Attorney, Agent, or Firm* — Fay Sharpe LLP

(57) ABSTRACT

Power converters, controllers, methods and non-transitory computer readable mediums are presented, in which a processor operates a switching rectifier in a first mode to regulate a DC bus voltage signal using rectifier switching control for motoring rectifier operation when the measured DC bus voltage value is less than or equal to a first threshold value, operates the switching rectifier in a second mode to regulate the DC bus voltage signal using rectifier switching control for regenerative rectifier operation when the measured DC bus voltage value is greater than the first threshold value and less than or equal to a higher second threshold value, and operates an inverter in a third mode to regulate the DC bus voltage signal using inverter acceleration/deceleration control when the measured DC bus voltage value is greater than the second threshold value.

20 Claims, 2 Drawing Sheets

DC BUS REGULATION USING RECTIFIER AND INVERTER

TECHNICAL FIELD

The subject matter disclosed herein relates to regulation of a DC bus voltage in a power conversion system.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Disclosed examples include power converters, controllers, methods and non-transitory computer readable mediums to regulate a DC bus voltage. In described examples, a processor operates a switching rectifier in a first mode to regulate a DC bus voltage signal using rectifier switching control for motoring rectifier operation when the measured DC bus voltage value is less than or equal to a first threshold value. The processor operates the switching rectifier in a second mode to regulate the DC bus voltage signal using rectifier switching control for regenerative rectifier operation when the measured DC bus voltage value is greater than the first threshold value and less than or equal to a higher second threshold value, and operates an inverter in a third mode to regulate the DC bus voltage signal using inverter acceleration/deceleration control when the measured DC bus voltage value is greater than the second threshold value.

BRIEF DESCRIPTION OF THE DRAWINGS

The following description and drawings set forth certain illustrative implementations of the disclosure in detail, which are indicative of one or more exemplary ways in which the various principles of the disclosure may be carried out. The illustrated examples are not exhaustive of the many possible embodiments of the disclosure. Various objects, advantages and novel features of the disclosure will be set forth in the following detailed description when considered in conjunction with the drawings.

DETAILED DESCRIPTION

Figure 1:
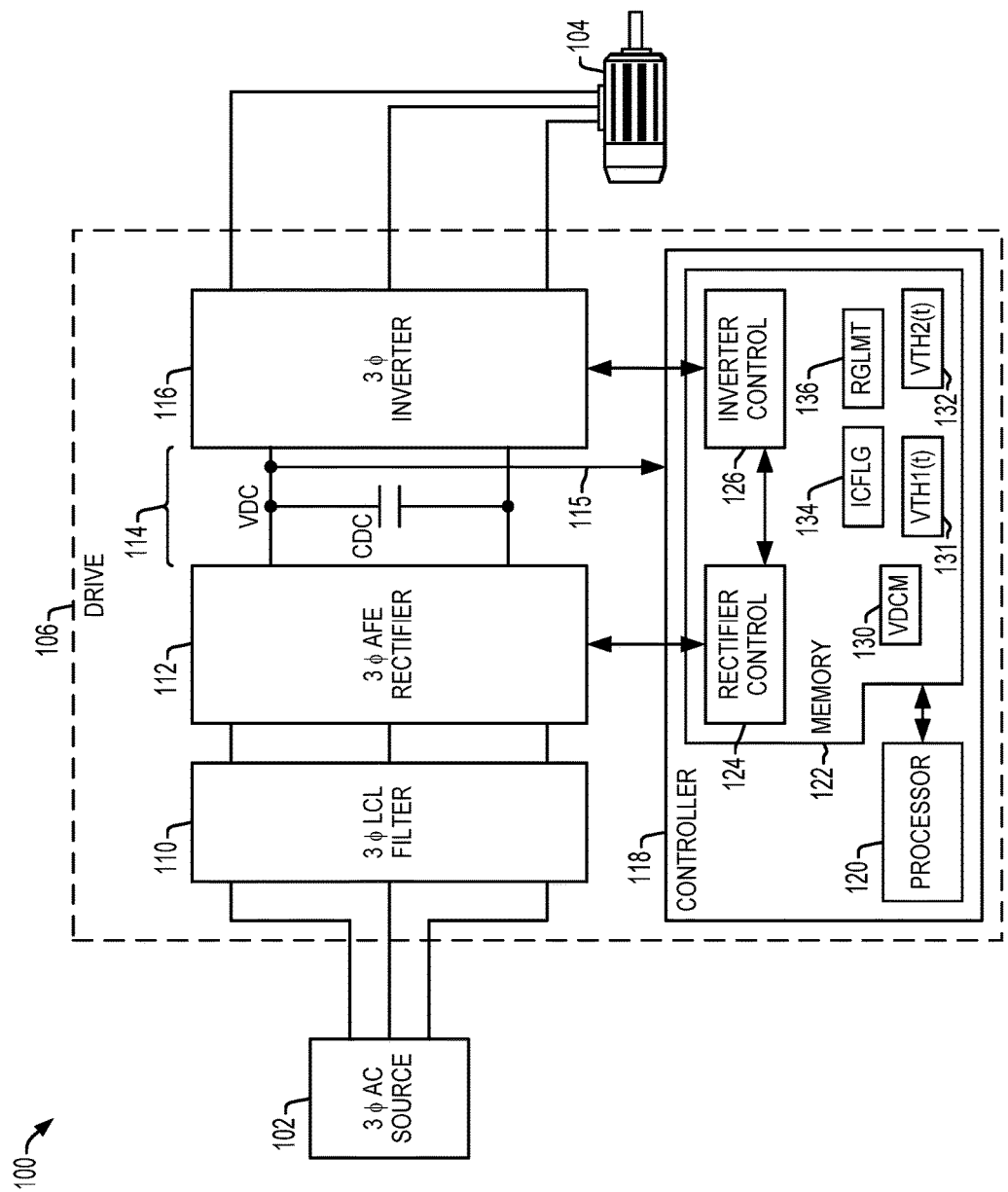
FIG. 1 is a schematic diagram.

Referring now to the figures, several embodiments or implementations are hereinafter described in conjunction with the drawings, wherein like reference numerals are used to refer to like elements throughout, and wherein the various features are not necessarily drawn to scale.

FIG. 1 shows a system 100, including an AC power source 102, a motor load 104, and a motor drive power conversion system 106. The power conversion system 106 converts AC input power from the source 102 into AC output power to drive a motor load 104. In the illustrated example, the source 102 and the load 104 are multiphase components (e.g., three phase). In other implementations, one or both of the source 102 and/or the motor load 104 can be single phase components. The power conversion system 106 includes a three phase filter circuit 110, a three phase active front end (AFE) rectifier 112, a DC bus circuit 114, and a three phase inverter circuit 116. The filter circuit 110 includes an AC input to receive an AC signal from the output of the power source 102. The rectifier 112 includes a rectifier input to receive an AC input signal from an output of the filter circuit 110. The rectifier 112 has an output to provide a DC bus voltage signal (e.g., DC bus voltage signal VDC) across a DC bus capacitor CDC the DC bus circuit 114 during a normal operating mode. The inverter 116 converts the DC bus voltage signal VDC to an AC output signal to deliver output power to the motor load 104.

In addition, the system 100 includes a controller 118 with at least one processor 120 and a memory 122. The controller 118 and the components thereof may be any suitable hardware, processor-executed software, processor-executed firmware, logic, or combinations thereof that are adapted, programmed, or otherwise configured to implement the functions illustrated and described herein. The controller 118 in certain embodiments may be implemented, in whole or in part, as software components executed using one or more processing elements, such as one or more processors 120, and may be implemented as a set of sub-components or objects including computer executable instructions stored in the non-transitory computer readable electronic memory 122 for operation using computer readable data executing on one or more hardware platforms such as one or more computers including one or more processors, data stores, memory, etc. The components of the controller 118 may be executed on the same computer processor or in distributed fashion in two or more processing components that are operatively coupled with one another to provide the functionality and operation described herein.

The controller 118 in one example includes multiple processors to individually implement rectifier and inverter control functions. In the example of FIG. 1, the processor 120 executes computer executable instructions stored in the memory 122 to implement various motor control functions. The memory 122 in this example includes executable instructions to implement a rectifier control component 124 and an inverter control component 126. The controller 118 provides switching control signals to operate the rectifier 112 and the inverter 116 during normal operation. The controller 118 includes driver circuitry (not shown) to deliver switching control signals to switches of the active rectifier 112 and the inverter 116 according to pulse width modulated switching signals generated by the rectifier control component 124 and the inverter control component 126. In one example, the rectifier control component 124 generates pulse width modulated rectifier switching control signals to operate switches of the rectifier 112 to at least partially regulate the DC bus voltage signal VDC according to a feedback signal or value by converting a single or multiphase AC input signal to provide the DC bus voltage signal VDC to the DC bus circuit 114. In one example, the inverter control component 126 generates pulse width modulated inverter switching control signals to operate switches of the inverter 116 to provide a single or multiphase AC output signal to the load 104 according to one or more feedback signals or values by converting the DC bus voltage signal VDC to implement one or more load control operating parameters, such as motor speed, torque, etc. In addition, the inverter control component operates in certain modes as detailed further hereinafter to selectively control acceleration and/or deceleration of the motor load 104 in order to at least partially regulate the DC bus voltage signal VDC.

The controller 118 in one example includes an input 115 to receive a voltage feedback signal representing the DC bus voltage VDC across the DC bus capacitor CDC, and stores a corresponding measured DC bus voltage value VDCM 130 in the memory. The controller 118 may include a further input (not shown) to receive a DC bus current feedback signal or value. Using the voltage feedback signal, the controller 118 determines whether an overvoltage condition exists in the DC bus circuit 114. In addition, the processor 120 maintains first and second voltage threshold values 131 (VTH1) and 132 (VTH2) in the memory 122, along with an inverter control flag 134 (ICFLG) and a regeneration limit value 136 (RGLMT). In one example, one or both of the threshold values 131 and 132 are time varying (e.g., VTH1($t$) and/or VTH2($t$)).

In one example, the controller 118 samples and converts the feedback signal VDC from the feedback input to generate a measured value 130 (VDCM) that represents the DC bus voltage signal VDC, stores the corresponding current (e.g., most recent) measured value 130 (VDCM) in the memory 122, and compares the measured DC bus voltage feedback value VDC to one or both of the first and second voltage threshold values 131 (VTH1($t$)) and 132 (VTH2($t$)). The controller 118 operates in one of three modes to regulate the DC bus voltage signal VDC according to (e.g., based on or in response to) the value of the measured value 130 (VDCM) relative to the threshold values VTH1($t$) and VTH2($t$). In one example, the controller 118 selectively uses rectifier switching control for rectifier motoring operation, rectifier switching control for rectifier regeneration, and/or inverter acceleration/deceleration control to regulate the DC bus voltage VDC in different DC bus regulation modes. In one example, the controller 118 is configured by program instructions in the memory 122 to implement the rectifier control component 124 and the inverter control component 126 in a selected one of three modes for each sample cycle of the DC bus voltage signal VDC to regulate the DC bus voltage. In certain examples, the controller 118 implements the second threshold in terms of a regenerative power transfer limit 136 (RGLMT), and the inverter control component 126 computes a regenerative power amount or value RGM according to a power value computed based on the measured DC bus voltage value VDCM, and compares the regenerative power value RGM to the regenerative power transfer limit 136.

In one example, the processor 120 operates the switching rectifier 112 in a first mode (MODE 1) to regulate the DC bus voltage signal VDC using rectifier switching control for motoring rectifier operation in response to (e.g., when) the measured DC bus voltage value VDCM is less than or equal to the first threshold value 131 (VTH1($t$)) stored in the memory 122. The processor 120 operates the switching rectifier 112 in a second mode (MODE 2) to regulate the DC bus voltage signal VDC using rectifier switching control for regenerative rectifier operation when the measured DC bus voltage value VDCM is greater than the first threshold value VTH1($t$) and less than or equal to a second threshold value 132 (VTH2($t$)) that is greater than VTH1($t$). In one example, the second threshold value VTH2($t$) represents a level at which a limit of the regenerative control range of the switching rectifier 112 is reached.

In one example, when the measured DC bus voltage value VDCM exceeds the second threshold value VTH2($t$) (e.g., the regenerative power value RGM is greater than or equal to the limit 136), the processor 120 operates the inverter 116 in a third mode (MODE 3) to regulate the DC bus voltage signal VDC using inverter acceleration/deceleration control. In this manner, the inverter 116 provides additional regulation capability to prevent overvoltage conditions in the DC bus circuit 114 where the regenerative capabilities of the switching rectifier 112 have become exhausted. For example, the power conversion system 106 may be a low harmonic motor drive in which the switching rectifier 112 only provides a limited amount of regenerative capability (e.g., 10%). In this case, sudden decreases in the drive output load may cause significant back EMF and regeneration of power from the quickly decelerating motor load 104 into the DC bus circuit 114. In this situation, the regenerative capabilities of the switching rectifier 112 may not be able to control the resulting increase in the DC bus voltage signal VDC. In the illustrated example, the controller 118 advantageously employs the acceleration and/or deceleration control capabilities of the switching inverter 116 to supplement or replace the regenerative control capabilities of the switching converter when the second threshold VTH2($t$) has been met or exceeded. In one example, the inverter 116 is operated to exclusively regulate the DC bus voltage signal VDC in the third mode. In one implementation, the processor concurrently operates the switching rectifier 112 and the inverter 116 in the third mode MODE 3 to regulate the DC bus voltage signal VDC using inverter acceleration control or deceleration control and rectifier switching control for regenerative rectifier operation. In this case, the DC bus voltage regulation capabilities of both the switching rectifier 112 and the switching inverter 116 are employed together in order to regulate the DC bus voltage signal VDC. In one particular application, this dual regulation capability advantageously mitigates overvoltage conditions of the DC bus circuit 114.

Figure 2:
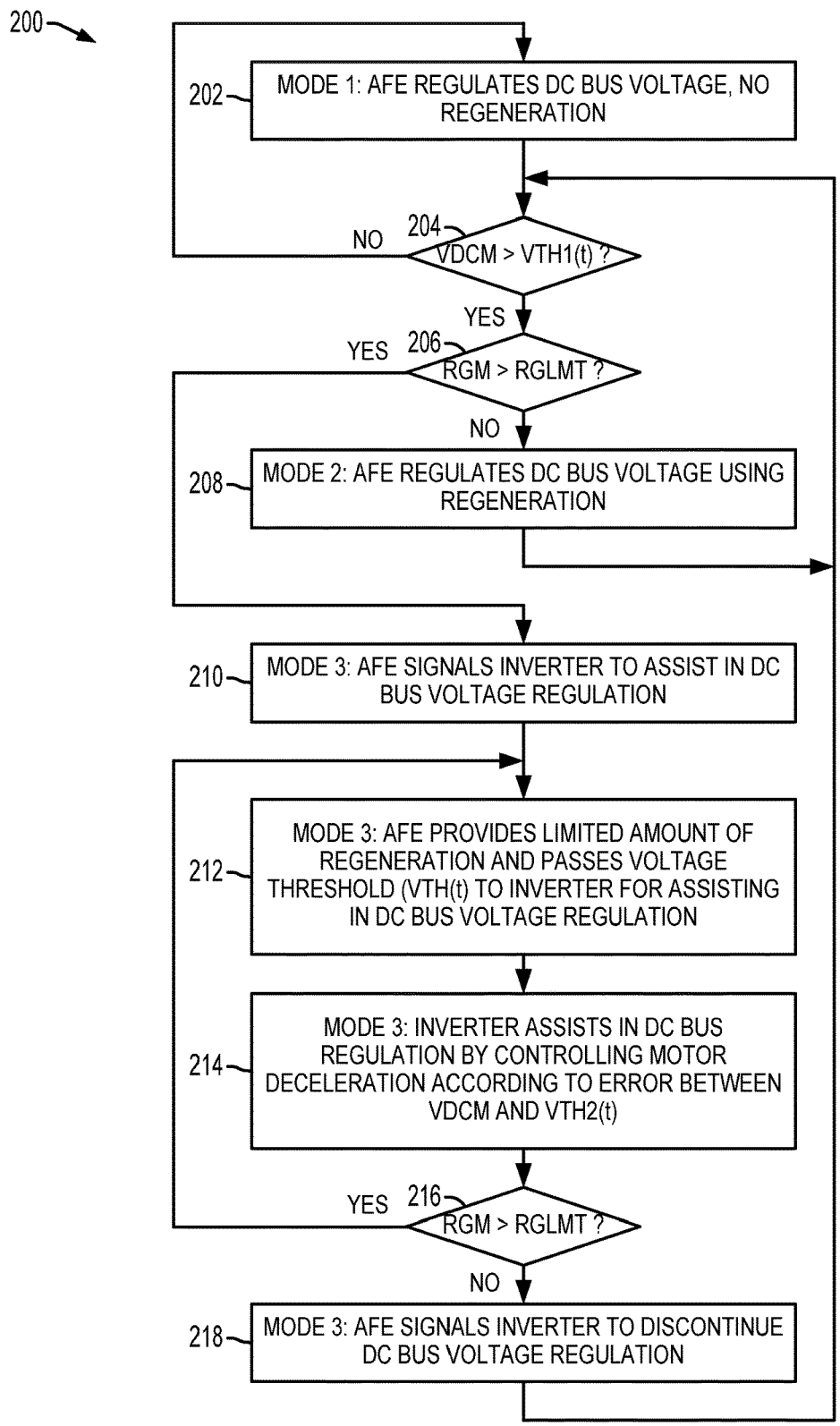
FIG. 2 is a flow diagram.

FIG. 2 illustrates a method 200 of regulating a DC bus voltage signal of a power conversion system 106. In one example, the memory 122 of the controller 118 in FIG. 1 includes computer executable instructions (e.g., components 124 and 126) that, when executed by the processor 120, cause the processor 120 to implement the method 200 of FIG. 2 in the example power conversion system 106 of FIG. 1, and the process or method 200 is described hereinafter in this context. The process or method 200 can be implemented in other systems (not shown) in order to regulate a power conversion system DC bus voltage signal. The example method 200 includes the processor 120 operating the switching rectifier 112 in a first mode (e.g., MODE 1) at 202 in FIG. 2 to regulate a DC bus voltage signal VDC according to a measured DC bus voltage value (e.g., VDCM 130 in FIG. 1). The regulation at 202 in one example uses rectifier switching control for motoring rectifier operation, where the processor 120 implements the rectifier control component 124 to generate PWM switching control signals to cause the rectifier switches to convert the AC input signal to provide a regulated DC bus voltage signal VDC. The rectifier control component 124 in one example uses the feedback signal from the feedback input 115 to provide closed-loop regulation of the DC bus voltage signal VDC. At 204 in FIG. 2, the processor 120 compares the sampled and converted DC bus voltage value VDCM to the first threshold value VTH1($t$) at 204. In one example, the rectifier control component 124 performs the comparison at 204. If the processor 120 determines that the measured voltage value VDCM is less than or equal to the first threshold value VTH1($t$) (NO at 204), the processor 120 continues to operate the switching rectifier 112 in the first mode at 202 in order to regulate the DC bus voltage signal VDC.

If the first threshold has been exceeded (YES at 204), the processor 120 compares the measured voltage value VDCM to the second threshold value VTH2($t$) at 206. In one example, the inverter control component 126 computes a regenerative power value RGM at least partially according to the measured voltage value VDCM and compares the computed regenerative power value RGM to the regenerative power transfer limit RGLMT 136 at 206. In one implementation, the inverter control component 126 computes the regenerative power value RGM to represent the amount of power the inverter 116 is sending to, or receiving from, the motor load 104. In one example, the controller 118 implements the inverter control component 126 to compute the regenerative power value as RGM=(van(t)*ia(t)+vbn(t)*ib(t)+vcn(t)*ic(t)), where vxn(t) is the instantaneous phase-neutral voltage output by the inverter 116, and ix(t) is the instantaneous phase-x current output by the inverter 116. In this example, vxn(t) is a function of the bus voltage, the inverter modulation index, and the electrical angle being generated by the inverter 116.

In another example, the controller 118 implements the inverter control component 126 in order to compute the regenerative power value as RGM=(sqrt(3)*VLL*IL*cos (theta)), where VLL is the rms line-line voltage magnitude, IL is the rms line current, and theta is the angle between the line-neutral voltage and the line current. In one implementation, VLL is a function of the bus voltage (e.g., determined according to the measured DC bus voltage value VDCM) and the inverter modulation index modIdx (e.g. VLL=modIdx*VDCM). In one implementation, RGM= −PINVM, where PINVM is the measured power being provided by the inverter 116. In this implementation, the computed regenerative power value RGM is positive when PINVM is negative, since the inverter 116 supplies a negative power during regenerative operation. In one example, the second threshold VTH2(t) is computed as VTH2(t)=Vafe(t)+Vbuffer, where Vafe(t) is the voltage set by the active front end rectifier 112 (e.g., a desired bus voltage value) and Vbuffer is a constant value. In one example, the DC bus voltage VDC is measured by a voltage measurement device (not shown in FIG. 1), and the result of this measurement is passed to both the rectifier control component 124 and the inverter control component 126. In certain implementations, the rectifier and inverter control components 124 and 126 can be implemented by separate processors.

In one example, at all time instants the rectifier and inverter and the associated control components 124 and 126 both have the measured DC bus voltage value VDCM available. In certain implementations, the action of the controller 118 is independent of instant values of the bus voltage, and the controller 118 can use past terms (e.g., to compute a derivative). In one example, the calculation of RGM is actually done in the inverter control component 126, and the result is passed to the rectifier control component 124. In one example, the inverter control component 126 computes RGM as a function of: the measured DC bus voltage value VDCM, the calculated inverter modulation index, the magnitude of the measured currents of the inverter, and the phase shift between the voltage and current (e.g., the power factor). The RGM may also be computed based on instantaneous voltages and currents (still a function of the measured DC bus voltage value VDCM, the calculated modulation index, and measured currents).

If the DC bus voltage signal VDC is above the first threshold and less than or equal to the second threshold (NO at 206), the processor 120 operates the switching rectifier 112 in the second mode (MODE 2) at 208 to regulate the DC bus voltage signal VDC according to the measured DC bus voltage value VDCM using rectifier switching control for regenerative rectifier operation. This operating mode transfers electrical power from the DC bus to the AC input source 102 in FIG. 1 (e.g., a power grid). The processor 120 in this example again samples and converts the feedback signal from the input 115 to generate and store an updated measured DC bus voltage value 130 (VDCM) in the memory 122, and compares the measured value 130 to the thresholds at 204 and 206 as previously described. If the measured value decreases below the first threshold (NO at 204), the processor 120 resumes operation in the first mode at 202. If the measured value VDCM remains above the first threshold and less than or equal to the second threshold (NO at 206), the processor 120 continues operation in the second mode at 208.

If the second threshold value is exceeded (YES at 206), the processor 120 operates the inverter 116 in the third mode (MODE 3) at 210, 212, 214 in order to regulate the DC bus voltage signal VDC according to the measured DC bus voltage value VDCM using inverter acceleration/deceleration control. In the illustrated example, the processor 120 implements the rectifier control component 124 at 210, which signals the inverter control component 126 to assist (e.g., and/or takeover) DC bus voltage regulation. As previously mentioned, the rectifier control component 124 and the inverter control component 126 can be implemented in separate processors in the drive controller 118, in which case the signaling at 210 can be through any suitable communications between the rectifier and inverter control processors.

In other implementations, a single processor 120 is used to implement the rectifier control component 124 and the inverter control component 126, and the signaling can be through the rectifier control component 124 setting a flag (e.g., inverter control flag 134 in the memory 122 (ICFLG) in FIG. 1). The flag indicates to the inverter control component 126 that an AFE regeneration limit (e.g., VTH2(t)) has been exceeded. In one implementation, moreover, the rectifier control component 124 (e.g., the AFE) provides a limited amount of regeneration at 212, and passes an updated error value to the inverter control component 126 (e.g., the inverter) for assisting in DC bus voltage regulation. In this example, the rectifier control component 124 continuously updates an error value, for example, computed as the difference between the second threshold value VTH and the measured DC bus voltage value VDCM, and provides this error value to the inverter control component 126. In certain implementations, moreover, the rectifier control component 124 operates according to a regeneration limit value 136 stored in the memory 122 (e.g., RGLMT), which can be modified or adapted. In this manner, the limit in the amount of regenerative DC bus voltage regulation of the rectifier control component 124 can be used to modify the second threshold value VTH2(t), and the rectifier control component 124 can pass the regeneration limit status to the inverter control component 126.

At 214 in the example method 200, the processor 120 operates the switching rectifier 112 and the inverter 116 in the third mode (MODE 3) to regulate the DC bus voltage signal VDC according to the measured DC bus voltage value VDCM using inverter acceleration control or deceleration control, in addition to any available rectifier switching control for regenerative rectifier operation. In other implementations, the regenerative operation of the active rectifier 112 is discontinued at 214, and the inverter control component 126 regulates the DC bus voltage signal VDC according to the error value provided by the rectifier control component 124. At 216, the processor 120 again determines whether the measured DC bus voltage value VDCM remains above the second threshold VTH1(t). If so (YES at 216), the processor continues operation in the third mode at 212 and 214. Otherwise (NO at 216), the processor 120 implements the rectifier control component 124, which signals the inverter control component 126 to discontinue inverter-based DC bus voltage regulation, and the process 200 proceeds to again compare the measured DC bus voltage value VDCM with the thresholds at 204 and 206 as previously described.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". This description uses examples to disclose various embodiments and also to enable any person skilled in the art to practice the disclosed subject matter, including making and using any devices or systems and performing any incorporated methods. It will be evident that various modifications and changes may be made, and additional embodiments may be implemented, without departing from the broader scope of the present disclosure as set forth in the following claims, wherein the specification and drawings are to be regarded in an illustrative rather than restrictive sense.

The following is claimed:

1. A power conversion system, comprising:
   a switching rectifier, including a rectifier input to receive an AC input signal, and a rectifier output to provide a DC bus voltage signal;
   a DC bus circuit, including a DC bus capacitor coupled to receive the DC bus voltage signal from the rectifier output;
   an inverter to convert the DC bus voltage signal to an AC output signal to deliver output power to a load; and
   a controller configured to operate at least one of the switching rectifier and the inverter to regulate the DC bus voltage signal in a selected one of a plurality of modes according to a measured DC bus voltage value, the controller configured to:
   operate the switching rectifier in a first mode to regulate the DC bus voltage signal using rectifier switching control for motoring rectifier operation,
   operate the switching rectifier in a second mode to regulate the DC bus voltage signal using rectifier switching control for regenerative rectifier operation, and
   operate the inverter in a third mode to regulate the DC bus voltage signal using inverter acceleration/deceleration control.

2. The power conversion system of claim 1, wherein the controller is configured to operate the switching rectifier and the inverter in the third mode to regulate the DC bus voltage signal using inverter acceleration control or deceleration control and rectifier switching control for regenerative rectifier operation.

3. The power conversion system of claim 2, wherein the controller is configured to:
   operate the switching rectifier in the first mode when the measured DC bus voltage value is less than or equal to a first threshold value;
   operate the switching rectifier in the second mode when the measured DC bus voltage value is greater than the first threshold value and less than or equal to a second threshold value, the second threshold value being greater than the first threshold value; and
   operate the switching rectifier and the inverter in the third mode when the measured DC bus voltage value is greater than the second threshold value.

4. The power conversion system of claim 3, wherein the controller is configured to:
   sample and convert a feedback signal from the DC bus circuit to generate a measured value that represents the DC bus voltage signal;
   store the measured value in the memory;
   perform a comparison of the measured value to at least one of the first threshold value and the second threshold value;
   determine the selected one of the plurality of modes according to the comparison; and
   operate the switching rectifier and the inverter in the selected one of the plurality of modes.

5. The power conversion system of claim 4, wherein the controller is configured to:
   generate pulse width modulated rectifier switching control signals to operate switches of the rectifier to at least partially regulate the DC bus voltage signal according to a feedback signal or value by converting the AC input signal to provide the DC bus voltage signal to the DC bus circuit; and
   to generate pulse width modulated inverter switching control signals to operate switches of the inverter to provide the AC output signal by converting the DC bus voltage signal.

6. The power conversion system of claim 5, wherein the controller is configured to generate the pulse width modulated inverter switching control signals to operate the switches of the inverter to control acceleration and/or deceleration of a motor load to at least partially regulate the DC bus voltage signal in the third mode.

7. The power conversion system of claim 2, wherein the controller is configured to:
   generate pulse width modulated rectifier switching control signals to operate switches of the rectifier to at least partially regulate the DC bus voltage signal according to a feedback signal or value by converting the AC input signal to provide the DC bus voltage signal to the DC bus circuit; and
   to generate pulse width modulated inverter switching control signals to operate switches of the inverter to provide the AC output signal by converting the DC bus voltage signal.

8. The power conversion system of claim 7, wherein the controller is configured to generate the pulse width modulated inverter switching control signals to operate the switches of the inverter to control acceleration and/or deceleration of a motor load to at least partially regulate the DC bus voltage signal in the third mode.

9. The power conversion system of claim 1, wherein the controller is configured to:
   operate the switching rectifier in the first mode when the measured DC bus voltage value is less than or equal to a first threshold value;
   operate the switching rectifier in the second mode when the measured DC bus voltage value is greater than the first threshold value and less than or equal to a second threshold value, the second threshold value being greater than the first threshold value; and
   operate the inverter in the third mode when the measured DC bus voltage value is greater than the second threshold value.

10. The power conversion system of claim 9, wherein the controller is configured to:
    sample and convert a feedback signal from the DC bus circuit to generate a measured value that represents the DC bus voltage signal;
    store the measured value in the memory;
    perform a comparison of the measured value to at least one of the first threshold value and the second threshold value;
    determine the selected one of the plurality of modes according to the comparison; and
    operate the switching rectifier and the inverter in the selected one of the plurality of modes.

11. The power conversion system of claim 1, wherein the controller is configured to:
    generate pulse width modulated rectifier switching control signals to operate switches of the rectifier to at least partially regulate the DC bus voltage signal according to a feedback signal or value by converting the AC input signal to provide the DC bus voltage signal to the DC bus circuit; and
    to generate pulse width modulated inverter switching control signals to operate switches of the inverter to provide the AC output signal by converting the DC bus voltage signal.

12. The power conversion system of claim 11, wherein the controller is configured to generate the pulse width modulated inverter switching control signals to operate the switches of the inverter to control acceleration and/or deceleration of a motor load to at least partially regulate the DC bus voltage signal in the third mode.

13. The power conversion system of claim 1, wherein the controller is configured to generate the pulse width modulated inverter switching control signals to operate the switches of the inverter to control acceleration and/or deceleration of a motor load to at least partially regulate the DC bus voltage signal in the third mode.

14. A method of regulating a DC bus voltage signal in a power conversion system, the method comprising:
    using at least one processor, operating a switching rectifier in a first mode to regulate a DC bus voltage signal in a power conversion system according to a measured DC bus voltage value using rectifier switching control for motoring rectifier operation;
    using the at least one processor, operating the switching rectifier in a second mode to regulate the DC bus voltage signal according to the measured DC bus voltage value using rectifier switching control for regenerative rectifier operation; and
    using the at least one processor, operating an inverter in a third mode to regulate the DC bus voltage signal according to the measured DC bus voltage value using inverter acceleration/deceleration control.

15. The method of claim 14, further comprising:
    using the at least one processor, operating the switching rectifier and the inverter in the third mode to regulate the DC bus voltage signal according to the measured DC bus voltage value using inverter acceleration control or deceleration control and rectifier switching control for regenerative rectifier operation.

16. The method of claim 15, further comprising:
    using at least one processor, operating the switching rectifier in the first mode when the measured DC bus voltage value is less than or equal to a first threshold value;
    using the at least one processor, operating the switching rectifier in the second mode when the measured DC bus voltage value is greater than the first threshold value and less than or equal to a second threshold value, the second threshold value being greater than the first threshold value; and
    using the at least one processor, operating the switching rectifier and the inverter in the third mode when the measured DC bus voltage value is greater than the second threshold value.

17. The method of claim 14, further comprising:
    using at least one processor, operating the switching rectifier in the first mode when the measured DC bus voltage value is less than or equal to a first threshold value;
    using at least one processor, operating the switching rectifier in the second mode when the measured DC bus voltage value is greater than the first threshold value and less than or equal to a second threshold value, the second threshold value being greater than the first threshold value; and
    using at least one processor, operating the inverter in the third mode when the measured DC bus voltage value is greater than the second threshold value.

18. A non-transitory computer readable medium, comprising computer executable instructions that, when executed by at least one processor, cause the at least one processor to:
    operate a switching rectifier in a first mode to regulate a DC bus voltage signal in a power conversion system according to a measured DC bus voltage value using rectifier switching control for motoring rectifier operation;
    operate the switching rectifier in a second mode to regulate the DC bus voltage signal according to the measured DC bus voltage value using rectifier switching control for regenerative rectifier operation; and
    operate an inverter in a third mode to regulate the DC bus voltage signal according to the measured DC bus voltage value using inverter acceleration/deceleration control.

19. The non-transitory computer readable medium of claim 18, comprising further computer executable instructions that, when executed by the at least one processor, cause the at least one processor to:
    operate the switching rectifier and the inverter in the third mode to regulate the DC bus voltage signal according to the measured DC bus voltage value using inverter acceleration control or deceleration control and rectifier switching control for regenerative rectifier operation.

20. The non-transitory computer readable medium of claim 18, comprising further computer executable instructions that, when executed by the at least one processor, cause the at least one processor to:
- operate the switching rectifier in the first mode when the measured DC bus voltage value is less than or equal to a first threshold value;
- operate the switching rectifier in the second mode when the measured DC bus voltage value is greater than the first threshold value and less than or equal to a second threshold value, the second threshold value being greater than the first threshold value; and
- operate the inverter in the third mode when the measured DC bus voltage value is greater than the second threshold value.

* * * * *